Figure 1:
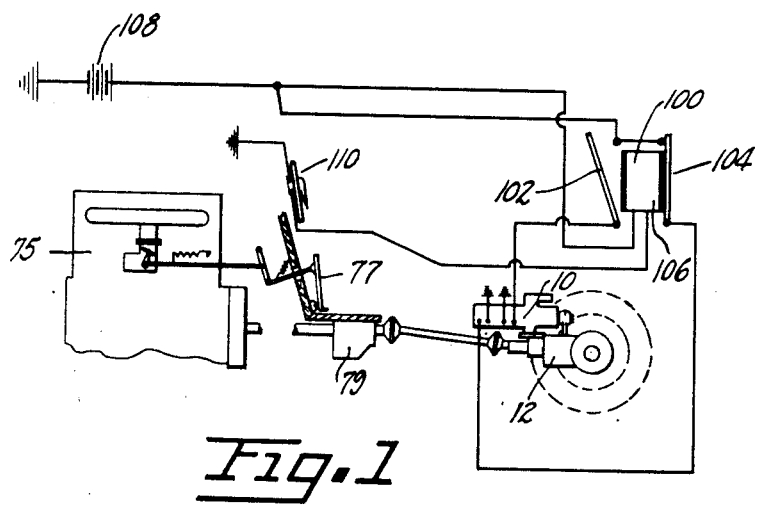

Nov. 30, 1954                T. H. THOMAS ET AL                2,695,531
                        ELECTRIC TWO-SPEED AXLE SHIFTER
                         Original Filed June 26, 1948

INVENTORS
THOMAS H. THOMAS
BY EARL R. PRICE
RICHARD H. LONG
　　H.O.Clayton
               ATTORNEY United States Patent Office
2,695,531
Patented Nov. 30, 1954

2,695,531

ELECTRIC TWO-SPEED AXLE SHIFTER

Thomas H. Thomas, Earl R. Price, and Richard H. Long, South Bend, Ind., assignors to Bendix Aviation Corporation, South Bend, Ind., a corporation of Delaware Original application June 26, 1948, Serial No. 35,426, now Patent No. 2,589,643, dated March 18, 1952. Divided and this application December 26, 1951, Serial No. 263,421

7 Claims. (Cl. 74—365)

This invention relates to motor vehicles and more particularly to controlling means for power transmission systems thereof.

More specifically, the invention relates to gear shifting mechanism and is of particular utility when employed in combination with speed changing and direction reversing gearing commonly used in coupling internal combustion engines of automobiles with the driving vehicle wheels or other propelling devices.

One object of the invention is to provide power operated means for operating a two-speed transmission mechanism, preferably mounted on the differential housing of an automotive vehicle or mounted within said housing and constituting a part of the differential and rear axle construction. Such a mechanism serves to supplement the conventional change speed transmission by providing, in addition to the conventional three-speeds forward and reverse driving ratios, two additional driving ratios between the power plant and the rear wheels. Thus for each of the two settings of the supplemental transmission there are provided, by the standard transmission, four different gear ratios, making eight different ratios in all.

Such a mechanism provides a more efficient power plant in the several types of passenger vehicles of the day. Both in climbing hills and on level ground there is a quiet performance of the motor at high vehicle speeds and accordingly less wear and tear on the motor parts. On the boulevard or in the country with the vehicle moving at say twenty to sixty miles per hour the two-speed transmission may be operated to select its high ratio; thereupon the car continues at the same speed and the motor speed drops say one third of its former speed. There is thus provided a mechanism that insures a minimum of noise and vibration, saves wear and tear on moving parts, and in general prolongs the life not only of the motor but of the entire vehicle.

When the transmission operating mechanism of my invention is used in heavy duty vehicles such as trucks carrying a heavy pay load the mechanism will make possible a so-called split shift that is progressive up-shift or down-shift of the combined transmissions; and in this operation the engine speeds are held near their peak torque output.

According to one desirable construction there is provided a double acting electric motor adapted to be operably connected to the two-speed axle mechanism of heavy duty vehicles, said motor being controlled by a manually operable mechanism preferably mounted in the dashboard of the vehicle.

A further object of my invention is to provide a simple, compact and easily serviced double acting motor unit adapted to operate a change speed transmission mechanism of an automotive vehicle said unit including electrical power means, preferably a plurality of solenoids, and further including yieldable force transmitting means serving to interconnect the power means with the transmission to be operated.

The above and other objects and features of the invention will appear more fully hereinafter from a consideration of the following description taken in connection with the accompanying drawings wherein one embodiment of the invention is illustrated by way of example.

Figure 2:
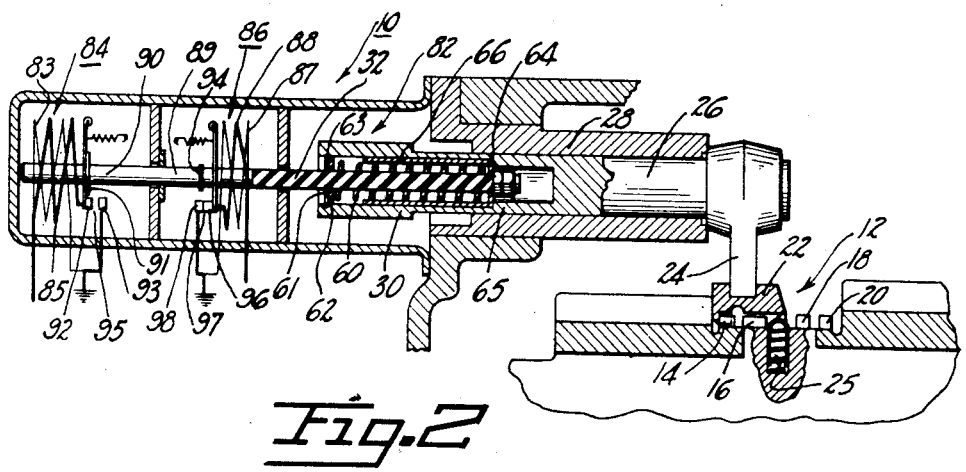

Figure 1 is a diagrammatic view of one embodiment of the transmission operating mechanism constituting my invention; and Figure 2 is a sectional view disclosing details of the electric motor unit of the mechanism of Figure 1.

The transmission operating power means constituting my invention is preferably employed to operate a two-speed axle transmission mechanism of an automotive vehicle. Referring to the two figures of the drawings disclosing one embodiment of my invention a transmission operating power unit 10 is mounted on a casing of a two-speed axle transmission mechanism 12. As disclosed in Figure 2 this transmission mechanism includes low speed gears 14 and 16 and high speed gears 18 and 20, one or the other of said pairs of gears being drivably interconnected with each other by an axially shiftable collar 22 actuated by a shifter fork 24. A spring loaded poppet member 25 may also be included in the transmission mechanism said member contacting the collar 22 and serving to aid the shifter fork 24 in holding the collar in its several operative positions. The gears 16 and 18 preferably include a common body portion and the gear setting of the transmission is established by moving the collar 22 to the right or left, Figure 2, to interconnect the gear members. The shifter fork 24 is connected to a shift rail 26 which is slidably mounted within a casing portion 28 of the power unit 10. The shift rail 26 is provided with a hollow projection 30 which houses a rod 32 connected to the two part armature 89, 90 of solenoid motors 84 and 86 constituting the power means of the unit 10.

Describing the force transmitting means interconnecting the motor units and the transmission, a shifter spring 60 sleeved over the rod 32 abuts, at its ends, washers 62 and 64 also sleeved over said rod; and a spacer collar 66 sleeved within the projection 30 serves to limit the compression of the spring 60 at maximum stroke. The washers 62 and 64 abut, respectively, a snap ring 63 mounted in one end of the projection 30 and a shouldered portion 65 of said projection. This spring 60 is preferably of such strength as to be compressed by a force which is less than the force exerted by either of the solenoid motors 84 and 86 when energized.

As to the remainder of the power plant of the vehicle disclosed in Figure 1 this mechanism includes a step type of change speed transmission 79, preferably a three speeds forward and reverse transmission; and said power plant also includes internal combustion engines 75 controlled in large measure by the operation of an accelerator 77.

Describing now the solenoid motors 84 and 86, the motor 84 includes a hold-in coil 83 and a pull-in coil 85; and the motor 86 includes a hold-in coil 87 and a pull-in coil 88. The motor 86 includes an armature 89 which is extended to provide armature 90 for the motor 84. It follows that the armatures 89 and 90 together constitute a two part armature for the motor portion of the unit 10. A collar 91 fixedly secured to the armature 90 moves into contact with a movable contact 92 to separate the same from a fixed contact 93 of a breaker switch 95; and a collar 94, fixedly secured to the armature 89, is adapted to separate a movable contact 96 of a breaker switch 97 from a fixed contact 93 of said switch. The movable contacts of the switches 95 and 97 are biased into contact with the fixed contacts of said switches by the return springs disclosed in Figure 2. The pull-in coils of both switches are connected to the movable contacts of the switches; and the hold-in coils and fixed contacts of the said switches are grounded, all as is disclosed in Figure 2.

Describing now the electrical means for controlling the electric motors 84 and 86 there is provided a relay 100, Figure 1, comprising a normally closed switch 104 and a winding 106. The pull-in and hold-in motor 84 are electrically connected to the relay switch 104. The pull-in and hold-in coils of motor 86 are electrically connected to a normally open switch 102 of the relay; and the switches 102 and 104 and the relay winding 106 are electrically connected to a grounded battery 103, all as is disclosed in Figure 1. The relay winding 106 is also wired to a grounded selector switch 110 which may be conveniently mounted in the dash of the vehicle.

Describing the operation of the motor unit 10 it will be assumed that the vehicle is at a standstill with the engine idling and the clutch disengaged; and that the selector switch 110 is open to select the low-gear setting of the transmission. The relay switches 102 and 104 will then be opened and closed respectively, all as is disclosed in Figure 1; and with this setting of the controls the motor 84 is energized to move the armatures 90 and 89 to the left to the position disclosed in Figure 2. The switches 95 and 97 are thus opened and closed respectively, and the transmission 12 is established in its low gear setting; and with this operation the hold-in coil 83 of the motor 84 will be operative to maintain the low gear setting of the parts of the transmission operating mechanism.

The driver will then depress the accelerator and engage the clutch to get the vehicle under way; and after the desired vehicle speed is reached he will effect the high gear setting of the transmission 12 by a closing operation of the selector switch 110 accompanied by the necessary operation of the accelerator in the control of the engine. The closing of the switch 110 will energize the relay 100 to close the switch 102 and open the switch 104 thereby effecting an energization of the motor 86 and a deenergization of the motor 84. The armature 89 will be moved to the right, Figure 2, in effecting this high gear operation of the transmission the switch 97 being broken just as the armature completes the end of its full stroke; however, the hold-in coil 87 remains energized to hold the spring 60 cocked. In this operation the accelerator is released to reverse the driving torque and demesh the transmission. Thereafter as the engine speed decreases the spring 60, which is partially cocked, expands to effect the high gear setting of the transmission.

Describing the operation of the yieldable connection 60, 66 etc. when solenoid motor 84 is energized the parts of the mechanism move to the position disclosed in Figure 2; and in this operation the washer 64 compresses the spring 60 which operation facilitates a relatively quick meshing of the low speed gears.

The operation of the yieldable connection in effecting a high gear setting of the transmission substantially duplicates the above described three stage low gear operation of the mechanism accordingly, this high gear operation will not be described. In this operation a collar 61 fixedly mounted on the rod 32, contacts the washer 62.

There is thus provided, by the transmission operating mechanism of Figures 1 and 2, a simple and compact double acting three-stage power unit 10 for operating the two-speed transmission 12. The combined effect of the pull-in and hold-in coils of the electric motors 84 and 86 serve to sufficiently load the force transmitting mechanism 82 to effect the desired operation of the transmission, the hold-in coils operating to insure a completion of said operation once initiated.

The transmission operating power means of my invention provides a simple, compact and easily serviced mechanism for operating a two-speed transmission of an automotive vehicle. The motor portion of the power means of my invention is easily controlled by a dash mounted switch and said motor serves to compress the yieldable means of a force transmitting means to subsequently effect a meshing of the gears of the transmission; and this meshing operation is relatively quiet in view of the relatively low strength of said yieldable means. With the mechanism of my invention the yieldable force transmitting means and the motor means are combined to form a compact two part unit one part of the unit constituting a motor and the other part a yieldable force transmitting means adapted to interconnect the motor with the transmission.

Although only one embodiment of the invention has been illustrated and described, various changes in the form and relative arrangements of the parts may be made to suit requirements.

This application is a division of my co-pending application No. 35,426, filed June 26, 1948, said application having matured into Patent No. 2,589,643, dated March 18, 1952.

I claim:

1. A shifting mechanism for a motor vehicle transmission comprising a shifting fork adapted to be moved back and forth in the operation of establishing the transmission in one or the other of two settings, said mechanism comprising power means for actuating the shifting fork including a unit comprising a multi-motored electric motor and yieldable force transmitting means interconnecting the motor and shifting fork, said motor including two coils adapted to be concurrently operative to energize the motor to impose a transmission operating load upon the yieldable force transmitting means, one of said coils being operative to maintain a load upon said force transmitting means after the remaining coil is de-energized, and said motor also including two other coils likewise operable to impose a transmission operating load upon the force transmitting means.

2. A shifting mechanism for a motor vehicle transmission comprising a shifting fork adapted to be moved back and forth in the operation of establishing the transmission in one or the other of two settings, said mechanism including power means for actuating the shifting fork including a transmission operating power unit comprising a multi-motored electric motor including a casing, a plurality of coils within the casing, a reciprocable two part armature slidably mounted within said coils, and a plurality of motor controlling breaker switches within the casing; together with yieldable force transmitting means interconnecting the armature and transmission.

3. A shifting mechanism for a motor vehicle transmission comprising a shifting fork adapted to be moved back and forth in the operation of establishing the transmission in one or the other of two settings, said mechanism including power means for actuating the shifting fork including a transmission operating power unit comprising a multi-motored electric motor including a casing, a plurality of coils within the casing, a reciprocable two part armature slidably mounted within said coils, and a plurality of motor controlling breaker switches within the casing, yieldable force transmitting means interconnecting the armature and transmission; together with means for controlling the operation of the motor including a relay and a manually operative switch for controlling the relay.

4. A double acting power unit adapted to be employed as a part of the transmission operating power means of an automotive vehicle including a casing, a reciprocable two part armature housed within the casing, two coils wound around one part of the armature and together with said armature part constituting an electrical motor, two coils wound around the other part of the armature and together with said armature part constituting another electric motor, a breaker switch housed within the casing and operative to control the operation of one of said coils, another breaker switch housed within the casing and adapted to control another of said coils, a second casing part, and yieldable force transmitting means housed within said latter casing part and connected to the two part armature.

5. A double acting power unit adapted to be employed as a part of the transmission operating power means of an automotive vehicle including a casing having three compartments, a reciprocable two part armature housed within two compartments of the casing, two coils wound around one part of the armature and together with said armature part constituting an electrical motor said motor being housed within one compartment of the casing, two coils wound around the other part of the armature and together with said armature part constituting another electric motor said motor being housed within another compartment of the casing, a breaker switch housed within the casing and operative to control the operation of one of said coils, another breaker switch housed within the casing and adapted to control another of said coils, a second casing part, and yieldable force transmitting means housed within a portion of said latter casing part and connected to the two part armature.

6. A double acting power unit adapted to be employed as a part of the transmission operating power means of an automotive vehicle including a two part casing one of said parts being constructed to provide three separate compartments, a reciprocable two part armature housed within two of said compartments, two coils wound around one part of the armature and together with said portion of the armature constituting an electric motor said motor being housed within one compartment of the casing, two coils wound around another portion of the armature and together with said armature portion constituting another electric motor said motor being housed within another compartment of the casing, a breaker switch housed within one compartment of the casing and operative to control the operation of one of said coils, a collar member fixedly mounted on a portion of the armature and contactable with the movable contact of said switch, another breaker switch housed within a compartment of the casing and operative to control the operation of another of said coils, another collar member fixedly mounted on a portion of the armature and contactable with the movable contact of the latter breaker switch; and yieldable force transmitting means housed in part within one of the casing parts and a part within one of the compartments and connected to the two part armature.

7. Power means adapted to operate a two-speed axle transmission mechanism of an automotive vehicle said power means including a power unit comprising two grounded electric motors and means adapted to interconnect said motors with a transmission; together with means for controlling the motors including a relay comprising a normally open switch, a normally closed switch and a coil, means for energizing said coil including a source of electricity and a manually operable selector switch, means interconnecting the source of electricity, the normally open switch and one of the grounded motors, and means interconnecting the source of electricity, the normally closed switch and the other of the grounded motors.

References Cited in the file of this patent

UNITED STATES PATENTS

| Number | Name | Date |
|---|---|---|
| 478,186 | Cooke et al. | July 5, 1892 |
| 707,967 | Griscom | Aug. 26, 1902 |
| 809,796 | Grabosch | Jan. 9, 1906 |
| 2,062,104 | Prince | Nov. 24, 1936 |
| 2,220,813 | Derungs | Nov. 5, 1940 |
| 2,583,065 | Stephan | Jan. 22, 1952 |